Aug. 1, 1961  H. B. PETERSON ET AL  2,994,444
CAN UNLOADING MACHINE
Filed July 21, 1958  8 Sheets-Sheet 1
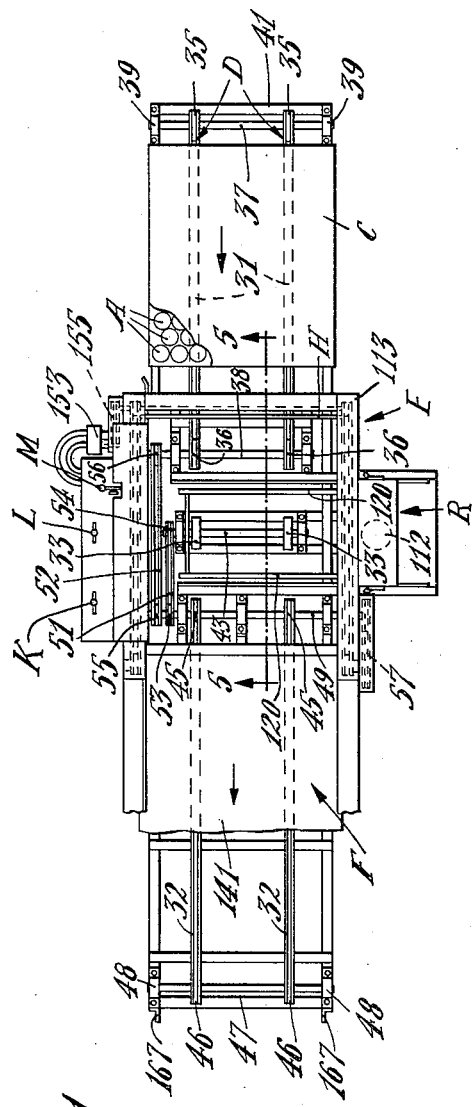
INVENTORS
HOWARD B. PETERSON
QUENTIN A. ANDERSON
BY
Leland R. McCann
George W. Reiber
ATTORNEYS

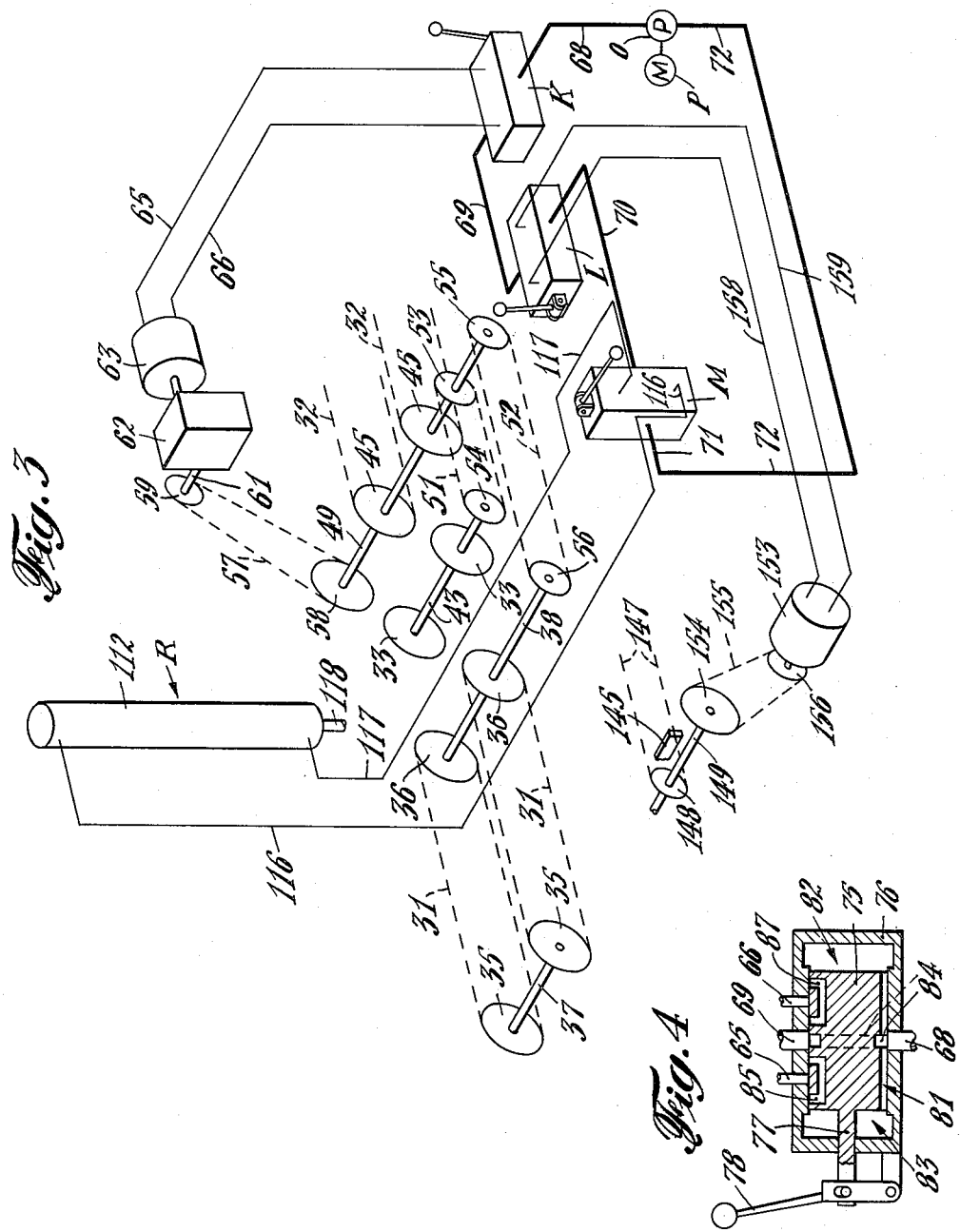

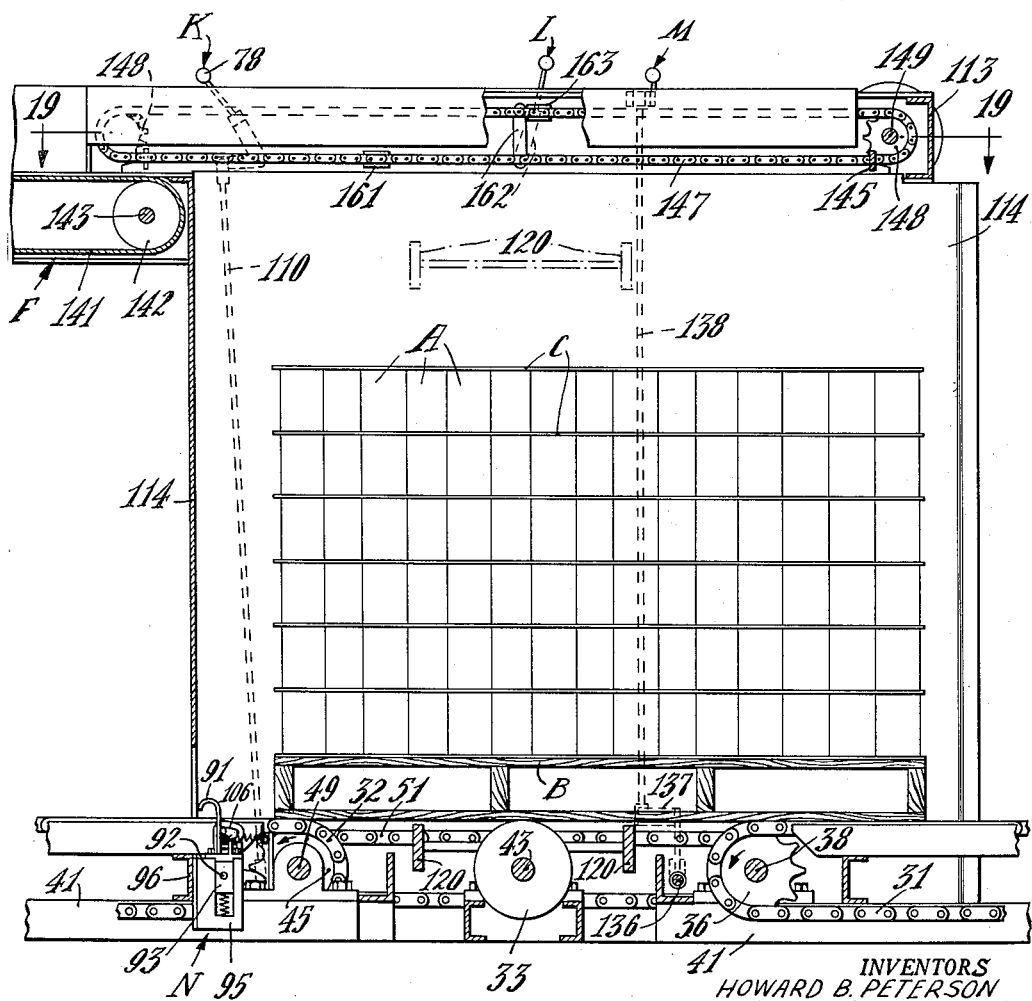

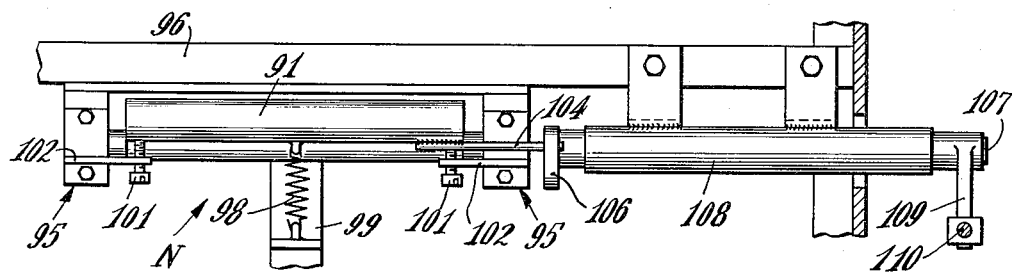
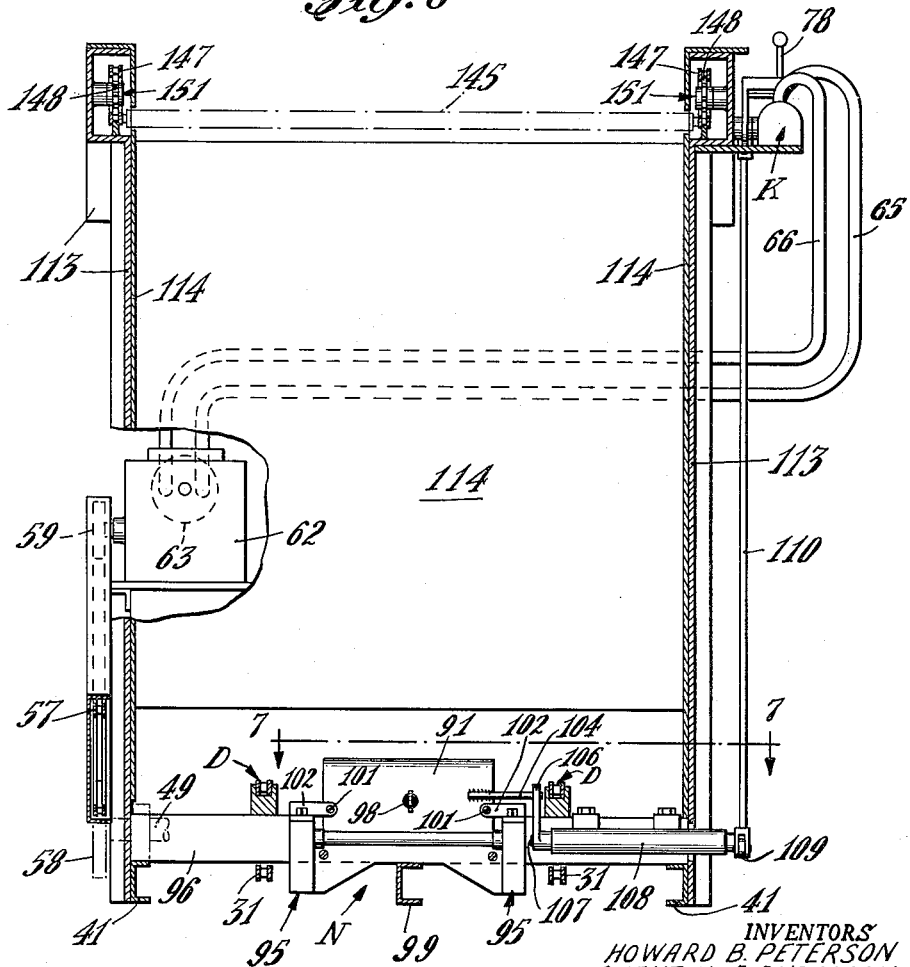

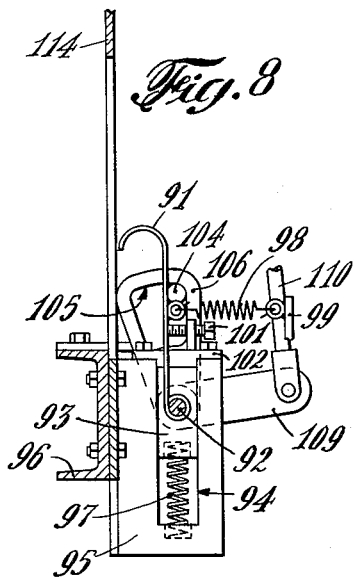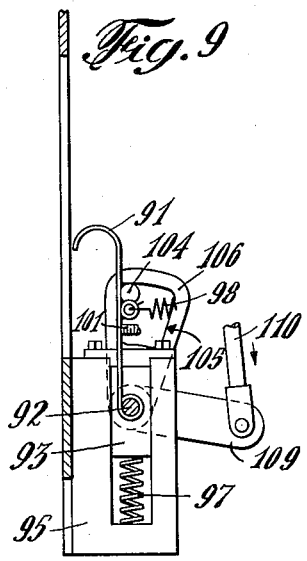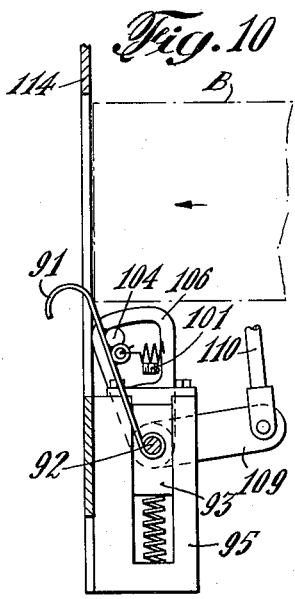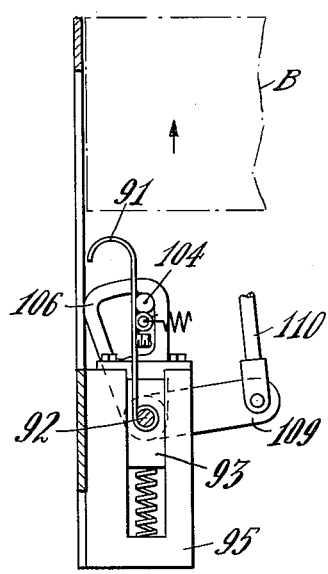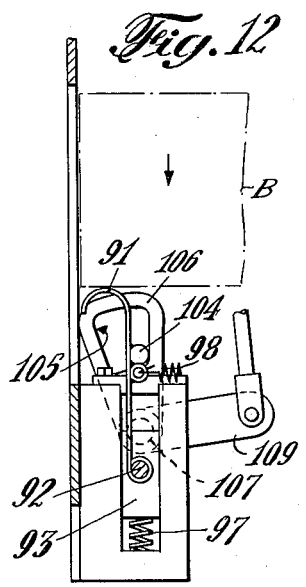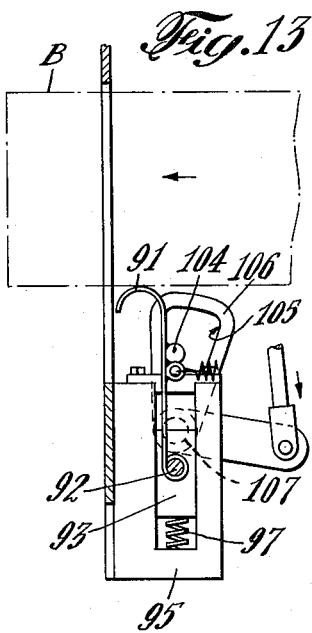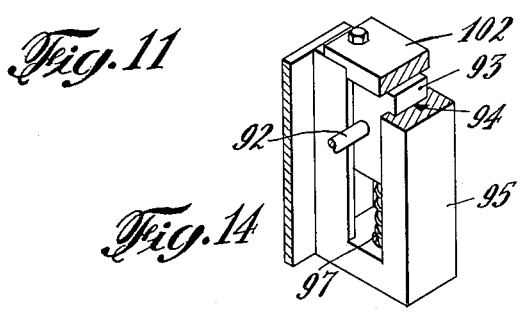

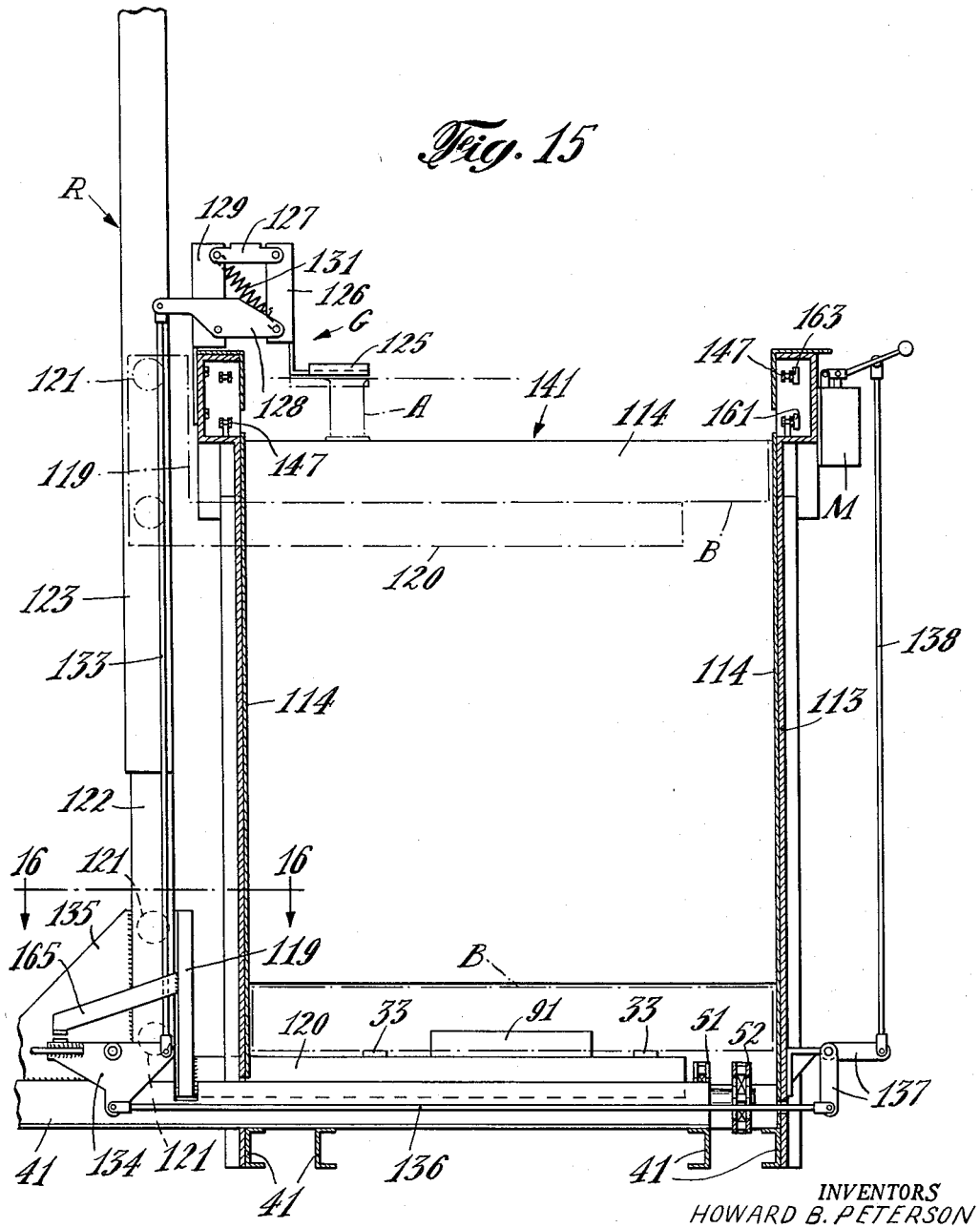

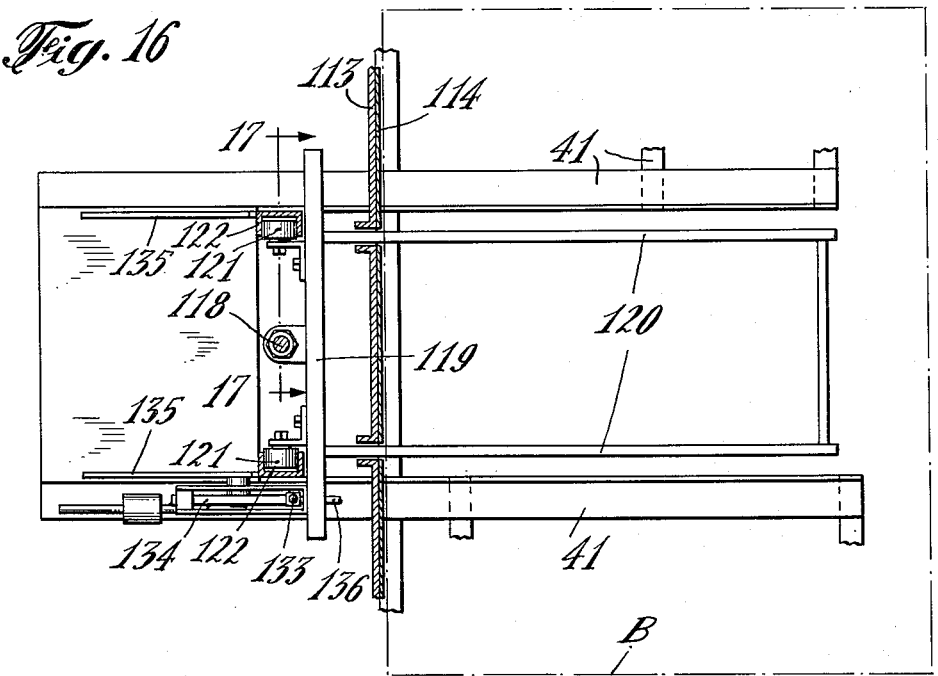
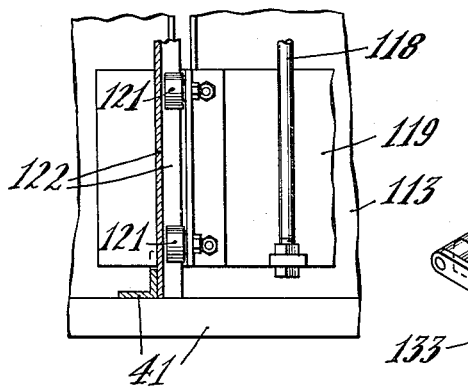
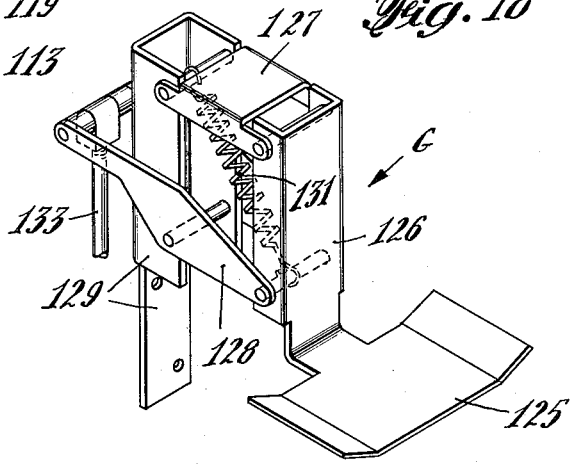
INVENTORS
HOWARD B. PETERSON
QUENTIN A. ANDERSON
BY
ATTORNEYS Aug. 1, 1961  H. B. PETERSON ET AL  2,994,444
CAN UNLOADING MACHINE
Filed July 21, 1958  8 Sheets-Sheet 8

INVENTORS
HOWARD B. PETERSON
QUENTIN A. ANDERSON
BY Leland R. McCann
George W. Reiber
ATTORNEYS United States Patent Office 2,994,444
Patented Aug. 1, 1961

2,994,444
CAN UNLOADING MACHINE
Howard B. Peterson, San Francisco, and Quentin A. Anderson, Mill Valley, Calif., assignors to American Can Company, New York, N.Y., a corporation of New Jersey
Filed July 21, 1958, Ser. No. 749,699
7 Claims. (Cl. 214—8.5)

The present invention relates to machines for unloading cans or containers arranged in stacked formation on pallets and has particular reference to devices for precisely locating a layer of the stacked cans or containers at a predetermined unloading level and for removing the layer from the stack.

In the can making industry, empty cans are frequently shipped to customers in bulk loads. In order to facilitate shipment of cans in this manner, the empty cans are arranged in orderly formed stacks of a plurality of superimposed layers supported on a pallet or platform. A chipboard divider sheet is usually interposed between adjacent layers of the cans to stabilize the stack. Thus the pallet with its bulk load of cans may be readily moved and transported through and from the can manufacturing plant to and through the customers plant. At the customers plant the empty cans are unloaded in any suitable manner for distribution to the can filling machines and the like.

An object of the instant invention is to provide a can unloading machine which economically handles bulk loaded cans on pallets so that the customer may be able to readily and quickly distribute the stacked cans to the various machines utilized to prepare them for filling and closing.

Another object is to provide such a machine which is semi-automatic in nature so that an operator has full control over its operations to facilitate rapid and economical unloading of the cans.

Another object is to provide for uninterrupted unloading of the cans from a palletized stack, layer-by-layer, through a controlled precise locating of each layer relative to a discharge conveyor prior to the removal of the layer, so that the properly located layer as a unit may be readily swept off the stack and onto the conveyor without damaging or disarranging the cans so that the cans may be rapidly and economically distributed to the place of use.

Another object is to provide for expeditious handling of the loaded pallets into and through the machine and the discharge of the unloaded pallets from the machine.

Numerous other objects and advantages of the invention will be apparent as it is better understood from the following description, which, taken in connection with the accompanying drawings, discloses a preferred embodiment thereof.

Referring to the drawings:

FIGURE 1 is a top plan view of a can unloading machine embodying the instant invention, parts being broken away;

FIG. 2 is a side elevation of the machine shown in FIG. 1;

FIG. 3 is a schematic view showing the machine driving elements and a hydraulic control system;

FIG. 4 is an enlarged sectional view of one of the control valves used in the hydraulic control system.

FIG. 5 is an enlarged vertical sectional view taken substantially along the line 5—5 in FIG. 1, with parts broken away;

FIG. 6 is an enlarged vertical sectional view taken substantially along the line 6—6 in FIG. 2, with parts broken away;

FIG. 7 is an enlarged horizontal sectional view taken substantially along the line 7—7 in FIG. 6, with parts broken away;

FIGS. 8, 9, 10, 11, 12 and 13 are enlarged vertical sectional views of a conveyor control device used in the machine, the views showing the moving parts in various positions during a cycle of operation of the device;

FIG. 14 is a perspective view of a portion of the control device shown in FIGS. 8 to 13 inclusive, parts being broken away;

FIG. 15 is an enlarged vertical sectional view taken substantially along the line 15—15 in FIG. 2, with parts broken away;

FIG. 16 is a horizontal sectional view taken substantially along the line 16—16 in FIG. 15, with parts broken away;

FIG. 17 is a fragmentary sectional view taken substantially along the line 17—17 in FIG. 16;

FIG. 18 is an enlarged perspective view of a leveling device shown at the upper left in FIG. 15;

Figure 19:
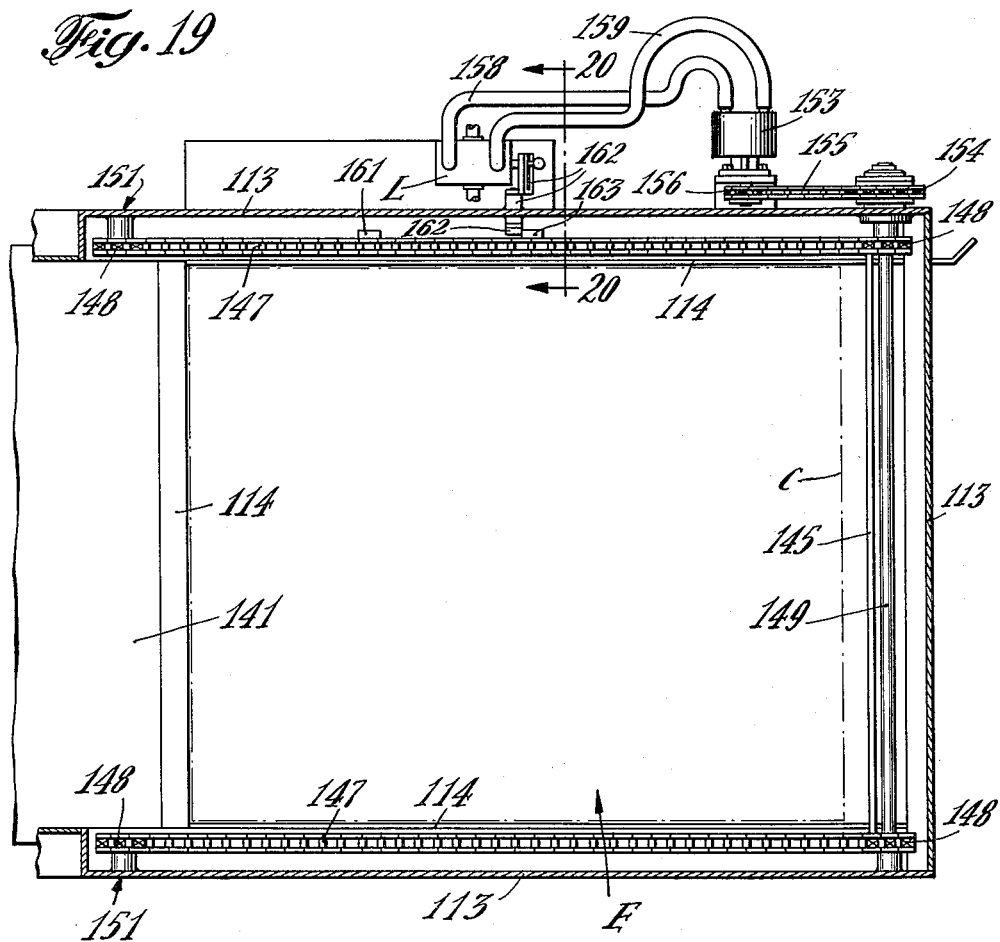
FIG. 19 is a horizontal sectional view taken substantially along the line 19—19 in FIG. 5, with parts broken away.

As a preferred and exemplary embodiment of the instant invention, the drawings disclose a machine for unloading individual layers of cans or containers A (FIGS. 1 and 2) from stacks of such layers supported on pallets or platforms B which are handled by conventional lift trucks or the like through the can manufacturers and the customers plants. Chipboard divider sheets C are utilized between the layers of cans to stabilize the stack on each pallet.

In the machine a loaded pallet B is deposited onto a horizontal conveyor D (FIGS. 1 and 2) and the conveyor is then set in motion to advance the pallet and its load of cans A into an unloading station E. At this unloading station E the conveyor D is stopped and the loaded pallet is elevated a sufficient distance to locate the top layer of cans A precisely at a predetermined level in alignment with a horizontally disposed discharge conveyor F. Locating of the top layer of cans A is effected automatically through a locating device G (FIGS. 15 and 18) disposed in the path of tarvel of the can stack. When the top layer of cans is precisely located, the locating device G stops further elevation of the stack.

In this located position of the top layer of cans A, an operator removes the chipboard divider sheet C from the top of the layer. A sweep device H is then actuated to push the entire top layer of cans, laterally, off the stack and onto the discharge conveyor F. This conveyor F carries them to any suitable place of deposit for distribution as hereinbefore mentioned.

When the removed layer of cans is fully clear of the stack, the pallet B and the remaining portion of its load of cans is again elevated until the new top layer contacts and actuates the locating device G. Actuation of this device stops the further elevation of the stack and thereby causes the stack to rest with its top layer precisely located relative to the discharge conveyor F, as before, for the removal of this new top layer. Thus through repeated elevations of the stack and precise location of each top layer of the remaining portion of the stack, relative to the discharge conveyor F for removal of the top layer onto the conveyor, the entire stack, layer-by-layer is unloaded from the pallet and discharged to a suitable place of deposit for distribution.

When the pallet B is empty, it is lowered to the horizontal conveyor D. This conveyor D is then reactivated to remove the empty pallet B from the unloading station E, and to simultaneously advance a new loaded pallet B into the unloading station for elevation and unloading of its cans layer-by-layer as described hereinabove. The empty pallet B is removed manually from the conveyor D for reuse. This completes the cycle of operation of the machine.

Control of the movement of the pallet through the machine and the feeding of the layers of cans from the stack on the pallet preferably is effected by hydraulic devices controlled manually by an operator through a set of three control valves; a pallet feed valve K, a sweep valve L, and an elevator valve M disposed along one side of the machine as shown in FIGS. 1 and 3.

Reference will now be had to drawings in more detail. The horizontal conveyor D, which conveys the pallets into and out of the machine, preferably comprises a pair of spaced and parallel horizontally disposed endless entrance chains 31 (FIGS. 1, 2 and 3), a similar coextensive pair of spaced and parallel horizontally disposed endless exit or discharge chains 32, and a pair of intervening support rollers 33.

The two entrance chains 31 operate over spaced and parallel pairs of idler sprockets 35 and driving sprockets 36 mounted on an idler shaft 37 and a driving shaft 38 respectively. The idler shaft 37 is located adjacent the entrance end of the machine, at the right as viewed in FIGS. 1 and 2, and is journaled for rotation in bearing blocks 39 attached to a flat bed frame 41 which extends the entire length of the conveyor D.

The two entrance chains 31 extend into the unloading station E and at this station the driving shaft 38 is journaled for rotation in suitable bearing blocks attached to the bed frame 41. At the station E, adjacent the driving ends of the entrance chains 31, the support rollers 33 are mounted on a cross-shaft 43 which is journaled for rotation in suitable bearing blocks attached to the bed frame 41.

The two exit chains 32 extend from the unloading station E to the discharge end of the machine, at the left as viewed in FIGS. 1 and 2. These two exit chains operate over a pair of spaced and parallel driving sprockets 45 located at the station E and over a pair of similar idler sprockets 46 disposed at the discharge end of the machine. The idler sprockets 46 are mounted on a cross-shaft 47 journaled for rotation in suitable bearing blocks 48 attached to the bed frame 41. The driving sprockets 45 are mounted on a driving shaft 49 journaled for rotation in suitable bearing blocks similar to the blocks 48 and attached to the bed frame 41.

The driving shaft 49 is the main drive shaft for the entire conveyor D and for this purpose is connected by endless drive chains 51, 52 to the support roller shaft 43 and the entrance chain drive shaft 38 respectively (see FIG. 3). The chain 51 operates over sprockets 53, 54 mounted on the main drive shaft 49 and the support roller shaft 43 respectively. The chain 52 operates over sprockets 55, 56 mounted on the main drive shaft 49 and the entrance chain drive shaft 38 respectively.

The main driving shaft 49 is actuated by an endless chain 57 which operates over a sprocket 58 (FIG. 3) on the shaft and over a main driving sprocket 59 on an output shaft 61 of a conventional gear reduction unit 62 actuated by a fluid motor 63. The fluid motor 63 preferably is of the character having a vane type driving rotor propelled by a fluid pressure medium circulated through a closed pipe system, such as disclosed in the following United States patents:

2,738,774 issued March 20, 1956, to O. E. Rosaen on Motor.

2,808,814 issued October 8, 1957, to P. G. Stewart on Engine.

2,789,542 issued April 23, 1957, to H. A. Vander Koay on Hydraulic Motor Control System.

Actuation of the fluid motor 63 preferably is effected through the manually operated pallet feed valve K hereinbefore mentioned and for this purpose is connected to the valve by a pair of fluid medium circulating pipes 65, 66 (FIG. 3). The pallet feed valve K is connected into a main pressure fluid circulating system which includes the sweep valve L, the elevator valve M, and a circulating pump O which is operated continuously by any suitable means such as an electric motor P. The fluid medium circulating through the system flows from the pump O through a connecting pipe 68, to and through the pallet feed valve K, a connecting pipe 69, to and through the sweep valve L, a connecting pipe 70, to and through the elevator valve M, returning to the pump O through connecting pipes 71, 72.

The valves K, L, M are similar in construction and are of the manually operated slide valve type such as disclosed in the above mentioned Patent 2,789,542. These valves as shown in FIG. 4 preferably comprise a cylindrical slide valve 75 which is slideably disposed in a closed housing 76. One end of the slide valve 75 is provided with a stem 77 which extends outside of the housing 76 and is connected to a pivotally mounted handle 78 which is manually manipulated into forward, reverse or neutral position by an operator. The valve shown in FIG. 4 is in the neutral or normal position of all of the valves.

The slide valve 75, along one side, the bottom as viewed in FIG. 4, is provided with a longitudinal groove 81 which connects with open spaces 82, 83 at the ends of the housing 76. The groove 81 in each of the valves K, L, M is in communication with the fluid inlet ends of the pipes 68, 69 70 respectively of the main circulating system. Directly opposite the inlet ends of the pipes 68, 69, 70, the slide of each valve K, L, M is provided with a circumferential groove 84 which is in communication at the top of the valve with the outlet ends of the pipes 69, 70, 71 of the respective valves K, L, M. This is to provide free circulation of the fluid medium through the valves K, L, M when they are all in neutral position.

Adjacent the outlet ends of the pipes 69, 70, 71, the slide 75 in each of the valves K, L, M is provided with a pair of U-shaped ports 85, 87 formed in the top of the slide, one on each side of the outlet pipe 69 as viewed in FIG. 4. In the pallet feed valve K, the U-shaped port 85 straddles the open end of the circulating pipe 65 as shown in FIG. 4, when the slide 75 is in neutral position, to cut off communication with the pipe 65. In a similar manner, with the slide 75 in the neutral position, the U-shaped port 87 straddles the open end of the circulating pipe 66 to cut off communication with this pipe.

When a loaded pallet B is deposited on the entrance end of the conveyor D and is ready for unloading, the operator shifts the handle 78 of the pallet feed valve K, toward the left as viewed in FIG. 4 to start actuation of the pallet conveyor D to advance the loaded pallet into the unloading station E. Movement of the valve handle 78 toward the left as viewed in FIG. 4 shifts the slide valve 75 towards the left, out of its neutral position and into a position where the circumferential groove 84 of the slide is out of register with the outlet end of the circulating pipe 69 to cut off the circulation of the fluid medium through this pipe. At the same time and in this position of the slide valve 75, one leg of the U-shaped port 85, the left leg as viewed in FIG. 4 is in communication with the open space 83 in the housing 76 and the opposite leg of this port 85 is in communication with the pipe 65 which connects with the fluid motor 63.

Thus the pressure fluid medium from the inlet pipe 68 of the main circulating system, flows through groove 81 in the slide, to and through the space 83 in the housing, to and through the U-shaped port 85, to and through the pipe 65, to and through the fluid motor 63. Upon passing through the fluid motor 63, the used fluid medium is returned to the main circulating system by way of the pipe 66 to and through the U-shaped port 87, to and through the outlet end of the pipe 69 of the system. The flow of the pressure fluid medium through the fluid motor 63, rotates the motor and thus actuates the pallet conveyor D as hereinbefore mentioned.

When the loaded pallet B is in proper position at the unloading station E, the pallet engages a trip device N (FIG. 5) which returns the pallet feed valve K to its neutral position and thereby cuts off flow of the fluid medium to the fluid motor 63 and thus stops the conveyor D to leave the loaded pallet in its proper position.

The trip device N (FIGS. 5 to 14 inclusive) comprises a vertically disposed broad trip arm 91 which projects up into the path of travel of the pallet B at the unloading station E. The trip arm 91 is mounted on a transverse pivot shaft 92, the ends of which are journaled in bearing blocks 93 (FIG. 8) slideably carried in vertical slideways 94 provided in a bracket 95 (FIGS. 6 and 7) attached to a cross-beam 96 of the bed frame 41. A compression spring 97 interposed between the bottoms of the bearing blocks 93 and the bracket 95 renders the trip arm 91 vertically yieldable during discharge of an empty pallet as will be explained hereinafter.

This trip arm 91 is maintained in its normal vertical relation by a tension spring 98 which is connected to the arm and to a stationary extension 99 of the bed frame 41 (see FIGS. 6 and 7). The spring 98 yieldably holds the arm 91 against a pair of adjustable set screws 101 disposed on the entrance side of the arm and carried in brackets 102 attached to the bracket 95. The brackets 102 also serve to retain the slide blocks 93 in the bracket 95 against the resistance of the compression springs 97.

Intermediate its ends, the trip arm 91 carries a trip rod 104 which projects laterally and horizontally beyond one side of the arm. The outer end of this trip rod 104 extends into a triangular or segmental opening 105 (FIG. 8) of a vertically disposed hollow lever 106 carried on a short pivot shaft 107 journaled in a bearing bracket 108 attached to the cross-beam 96 of the bed frame 41 (see FIGS. 6 and 7). The outer end of the pivot shaft 107 carries a horizontally disposed lever 109 which is connected by an upright link 110 to the handle 78 of the pallet feed valve K (FIGS. 5 and 6).

In the neutral position of the pallet feed valve K the hollow lever 106 connected thereto is in its normal position as shown in FIG. 8, with the trip rod 104 of the trip arm 91 disposed adjacent the side of the hollow lever 106 on the right as viewed in FIG. 8. When the pallet feed valve K is actuated to start the fluid motor 93 to effect advancement of the loaded pallet B into the unloading station E through operation of the pallet conveyor D, the link 110 is moved down to rock the hollow lever 106 into the position shown in FIG. 9, where the trip rod 104 of the trip arm 91 engages the opposite side of the lever 106 without any movement of the trip arm 91.

The hollow lever 106 remains in this position during the entrance of the loaded pallet B into the unloading station E. When the pallet is in proper position at this station, it engages the trip arm 91 and pivots it into the position shown in FIG. 10. This pivoting of the trip arm 91 rocks the hollow lever 106 toward the left into the position shown in FIG. 10 and thereby, through the link 110, resets the pallet feed valve K into a neutral condition to cut off the flow of fluid medium to the fluid motor 63 and thereby stop the motor and the pallet conveyor D actuated thereby. This leaves the loaded pallet B in the proper position at the unloading station E.

At the unloading station E, the loaded pallet B is lifted off the conveyor D and elevated to a level where its top layer of cans is properly positioned relative to the discharge conveyor F for transfer thereto as mentioned hereinbefore. This elevation of the loaded pallet is effected by a hydraulic elevator device R (FIGS. 3 and 15) controlled by the elevator valve M actuated by the operator at the proper time following the automatic stopping of the pallet conveyor D.

The elevator device R preferably comprises a vertically disposed hydraulic cylinder 112 located adjacent the unloading station E and supported outside of the station on an upright unloading frame 113 attached to the bed frame 41. The lower portion of the frame 113 is lined with smooth flat side plates 114 as shown in FIGS. 1, 2 and 15, to facilitate holding the stack of cans in proper place during elevation of the pallet, and during removal of the top layer of cans.

The upper and lower ends of the cylinder 112 are connected to the elevator valve M by fluid medium circulating pipes 116, 117 as shown in FIG. 3. The cylinder encloses a piston having a depending piston rod 118 which at its lower end is connected to a vertically movable elevator bracket 119 (FIGS. 15 and 16) having a pair of laterally projecting pallet carrying arms 120 which extend under the path of travel of the pallet B and adjacent the support rollers 33 at the base of the unloading station. Adjacent its vertical edges, the elevator bracket 119 carries two pairs of spaced guide rolls 121 which ride in a pair of spaced and parallel vertically disposed channel shaped guide rails 122 attached to a vertical support member 123 of the frame 113. The guide rails 122 maintain the elevator bracket 119 in a vertical position and relieve the piston rod 118 of bending strain during operation of the elevator devices.

When the operator is ready to elevate the loaded pallet B at the unloading station E, he pushes upwardly on the handle of the elevator valve M, as viewed in FIG. 15 and this action shifts the slide within the valve to cause the pressure fluid medium to flow through pipe 117 (FIG. 3) into the bottom of the cylinder 112 and against the piston therein to raise the piston and the elevator bracket 119 connected thereto. Fluid medium in the upper portion of the cylinder 112 returns to the elevator valve M by way of the pipe 116. The raising of the elevator bracket 119 picks up the loaded pallet B on the elevator arms 120 and thus carries the pallet with its load of cans upwardly toward the discharge conveyor F.

The operation of the elevator valve M to elevate the pallet B also sets the locating device G to stop elevation of the pallet when the top layer of cans in the stack on the pallet is at a predetermined level adjacent the discharge conveyor F. The locating device G preferably comprises a vertically movable, horizontally disposed shoe 125 (FIGS. 15 and 18) located in the vertical path of travel of the layers of cans and formed on a vertically disposed support arm 126. The arm 126 is pivotally attached by pairs of parallelogram levers 127, 128 to a bracket 129 attached to the top of the upright frame 113 at the unloading station. A spring 131 connected diagonally from the bracket 129 to the vertical arm 126 supports the weight of the locating shoe 125 and provides for sensitive operation of the shoe.

For actuation of the locating shoe 125 by the elevator valve M, the parallelogram arm 128 is connected by a depending link 133 (see FIG. 15) to a counterbalanced triangular lever 134 pivotally mounted on a bracket 135 attached to the bed frame 41. The lever 134 in turn is connected by a horizontal link 136 to a bell crank 137 which is connected by a vertical link 138 to the actuating handle of the elevator valve M.

Hence when the elevator valve M is actuated to elevate the pallet and its load of cans, the valve handle through the linkage above described depresses the locating shoe 125 into a predetermined stop position as shown in dotted lines in FIG. 15.

When the rising pallet B reaches an elevation where the top layer of cans engages against and slightly raises the locating shoe 125, the shoe through its connecting linkage returns the handle of the elevator valve M toward its neutral position and thereby cuts off the flow of the pressure fluid medium to the cylinder 112. This causes the elevator to stop with the top layer of cans on the pallet in a precise location relative to the discharge conveyor F for unloading thereto.

By referring to FIG. 4 it will be seen that the ports 85, 87 are closed, and consequently the movement of the elevator stopped, somewhat prior to the time the valve M reaches its final neutral position. However, a conventional spring detent (not shown) in the elevator valve M causes the valve handle to continue on and snap back into its final neutral position when once started. This slight extra movement causes a slight overtravel of the connecting linkage (FIG. 15) and provides a little extra rising movement of the shoe 125, after the elevation of the cans has ceased, to lift the shoe clear of the top of the load to permit removal of the chipboard divider sheet C and the top layer of the cans (see FIG. 15).

When the top layer of cans A on an elevated pallet B is properly located for unloading, the chipboard divider sheet C on which the cans rest, is flush with the discharge conveyor F. The discharge conveyor F preferably is a horizontally disposed endless belt 141 (FIGS. 1, 2 and 5) which operates over a pulley 142 mounted on a shaft 143 located adjacent the unloading station E at its top edge. The belt 141 leads to any suitable place of discharge of the cans, as for example to the machine which distributes the cans. The belt 141 preferably is driven from this machine.

In its properly located position, the top layer of cans on the pallet is swept off as a unit onto the discharge belt 141. This is effected by a sweep bar 145 (FIGS. 5 and 6) of the sweep device H. The sweep bar 145 extends transversely across the top of the unloading station E at a level in alignment with the properly located top layer of the cans on the elevated pallet. The ends of the sweep bar 145 are connected to a pair of spaced and parallel, horizontally disposed endless sweep chains 147 located along the top sides of the unloading station E. These chains 147 operate over pairs of spaced and parallel sprockets 148 carried on a transverse shaft 149 and a pair of stub shafts 151 journaled in bearings on the top of the unloading station frame 113 (see also FIG. 19).

The sweep chains 147 are actuated by a fluid motor 153 (FIGS. 3 and 19) which is similar to the fluid motor 63. For this purpose the sprocket shaft 149 carries a driving sprocket 154 which is driven by an endless chain 155, driven by a sprocket 156 on the fluid motor 153. The motor 153 is connected by fluid medium circulating pipes 158, 159 to the sweep valve L.

Hence when the top layer of cans on the pallet is ready to be unloaded, the operator shifts the handle of the valve L from its neutral position into a forward position and thus causes the pressure fluid medium to flow through the valve into the motor 153 to actuate the sweep chains 147 in a direction which carries the sweep bar 145 forward into contact with the top layer of cans and continues across the stack of cans to sweep the top layer off onto the discharge belt 141.

Figure 20:
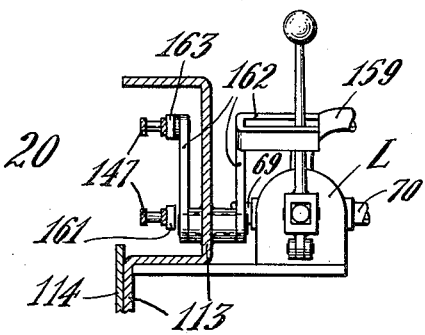
FIG. 20 is a fragmentary enlarged vertical sectional view taken substantially along the line 20—20 in FIG. 19.

When the top layer of cans is fully unloaded onto the discharge belt 141, the handle of the valve L is returned to its neutral position to cut off the flow of fluid medium to the motor 153 to cause the motor and the sweep chains 147 actuated thereby, to stop. This is effected by a stop lug 161 which is attached to the lower run of the sweep chain 147 adjacent the sweep valve L. When the sweep bar 145 reaches its full unloading position, the stop lug 161 engages and rocks a lever 162 (see FIGS. 5, 19 and 20) which is connected to the handle of the sweep valve L and thus swings the handle back into its neutral position.

Upon return of the handle of the valve L to its neutral position, the operator actuates the handle into a reverse position to actuate the fluid motor 153 in a reverse direction and thus return the sweep bar 145 to its normal starting position as shown in FIG. 5. When the sweep bar 145 reaches this position, a lug 163 on the upper run of the sweep chain 147 adjacent the sweep valve L, engages and rocks the lever 162 to shift the handle of the valve L back into its neutral position to stop the motor 153 and the sweep bar 145.

One layer of the cans on the pallet B has now been unloaded from the pallet, and the pallet is ready for elevation a height of one can layer to reposition the stack with its new top layer in position for unloading in a similar manner. For this purpose the operator now actuates the elevator valve M to reset the locating shoe 125 and to cause the fluid medium to flow into the cylinder 112 to further elevate the pallet carrying arms 120 to lift the pallet and its cans the required distance. When the new top layer of cans engages and lifts the locating shoe 125, the new top layer is in precise position for unloading and the unloading cycle of operation is repeated as explained immediately above.

Thus through repeated elevations of the pallet B for each layer of cans carried thereon, as explained above, each layer in turn is precisely located by the locating shoe 125 and its connection with the elevator valve M and after such location, is unloaded from the stack and discharged for suitable distribution of the cans.

When the pallet B is completely unloaded, it is lowered to the bottom of the unloading station E and is discharged therefrom. For this purpose the operator actuates the handle 78 of the elevator valve M in a reverse direction and thereby causes the fluid medium to flow into the top of the cylinder 112 and out of the bottom thereof, thereby causing the elevator devices to move downwardly.

When the downwardly moving empty pallet B reaches the bottom of the unloading station E and is deposited on the support rollers 33 of the conveyor D, a stop lug 165 (FIG. 15) carried on the elevator bracket 119, engages and rocks the counterbalanced triangular lever 134, to return the handle of the elevator valve M to its neutral position. This cuts off the flow of the fluid medium to the cylinder 112 and thereby causes the hydraulic elevator R to stop. The elevator when stopped is in its normal position ready to receive the next pallet for unloading as hereinabove described.

During this downward movement of the empty pallet B and as it approaches the support rollers 33 of the conveyor D, the pallet moves down on top of the trip arm 91 as shown in FIGS. 11, 12 and 13, and the trip arm 91 is merely depressed without in any way affecting the hollow triangular lever 106. It is for this purpose that the trip arm 91 is mounted on the spring loaded slide blocks 93.

Thus when the empty pallet reaches the bottom of the unloading station E and is ready to be discharged, the hollow lever 106 is free to move when actuated to the starting position as shown in FIG. 13. At this time the operator shifts the handle of the pallet feed valve K to cause flow of the pressure fluid medium into and through the fluid motor 63 to reactivate the conveyor D and thus carry the empty pallet B out of the unloading station E onto the discharge chains 32 from which the pallet is removed by a conventional lift truck as mentioned heretofore. A stop member 167 (FIGS. 1 and 2) at the end of the discharge chains 32 provides a bumper for the pallet.

This same operation of the conveyor D to carry the empty pallet B out of the unloading station E for discharge, also carries a loaded pallet B into the station E for unloading by a repeat cycle of operation of the machine as explained above. As an incident to this operation of the conveyor D, the trip arm 91 (FIG. 13) snaps up behind the empty pallet as soon as the pallet moves out of the unloading station E, and is thus in operating position to be engaged by and to stop the incoming loaded pallet in proper position at the station E as shown in FIGS. 8, 9 and 10.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for unloading containers arranged in stacked layer formation on a pallet, a conveyor extending into an unloading station for receiving and carrying a pallet loaded with stacked layers of containers, a fluid motor for actuating said conveyor to advance said loaded pallet into said unloading station, a manually operable valve connected to said motor and to a source of fluid pressure for starting said motor, a trip arm connected to said valve, said trip arm being disposed at said unloading station in the path of travel of said pallet and responsive to engagement of said advancing pallet to actuate said valve to stop said motor and thereby stop said pallet in a predetermined position at said unloading station, an elevator mechanism at said unloading station to elevate said positioned pallet, a horizontally movable sweep bar disposed at said unloading station for removing the uppermost layer of containers from said elevated pallet, a movable actuating element of said valve being connected to a hollow lever disposed adjacent said trip arm, said lever having a segmental clearance opening, said trip arm having an extension extending into said opening adjacent one side of said lever to provide for actuation of said valve and said lever without interference with said trip arm and to provide for engagement of said trip arm extension with the opposite side of said lever when said arm is actuated by said pallet to rock said lever and actuate said valve connected thereto to stop said motor.

2. A machine of the character defined in claim 1 wherein said trip arm is provided with a yieldable mounting vertically depressible by an empty pallet being discharged, without interfering with said hollow lever.

3. The container unloading machine of claim 2, wherein said elevator mechanism includes a hydraulic cylinder and a valve connected thereto for moving the elevator in opposite vertical directions, and control linkage connected to said elevator valve and actuated by the topmost container layer on said pallet to stop elevation of the pallet at a predetermined vertical position, said control linkage being actuated by the descending elevator to stop the elevator when the empty pallet carried thereby has reached said conveyor for discharge from the machine.

4. In a machine for unloading containers arranged in stacked layer formation on a pallet, a horizontal pallet conveyor extending through an unloading station in said machine, fluid pressure means for actuating said conveyor, a pallet conveyor valve connected to said fluid pressure means and to a source of fluid pressure for manual operation to actuate said conveyor to advance a loaded pallet into said unloading station while conveying an empty pallet out of said station, stop means operable by engagement with said pallet at said station and connected to said pallet conveyor valve to stop said conveyor and locate a loaded pallet in predetermined position, an elevator at said station for receiving said pallet, fluid pressure means for raising and lowering said elevator to elevate said loaded pallet and to lower said pallet when empty, a manually operated valve connecting said elevator actuating means with said source of fluid pressure, a linkage system connected to said elevator valve and actuated by the top container layer on said pallet for stopping the elevator at a predetermined raised position, a sweep bar disposed adjacent the upper limit of container travel on said loaded pallet for unloading said top layer of containers, valve controlled fluid pressure means for moving said sweep bar in opposite horizontal directions, and means on said elevator for actuating said linkage system to stop downward movement of said elevator with an empty pallet thereon preparatory to discharge of said empty pallet from said unloading station.

5. In a machine for unloading containers arranged in stacked layer formation on a pallet, the combination of a conveyor having drive means for advancing the pallet into and through an unloading station, a valve for controlling movement of said conveyor, movable means actuated by a pallet entering said station for opening said valve to stop said conveyor, an elevator at said station for receiving said pallet, a valve for actuating said elevator to lift said pallet into position for discharging said top layer of cans therefrom when the elevator valve is closed, a locating member connected to said elevator valve and movable into the path of said top can layer when said elevator valve is closed to lift said pallet, said connection being operative by said locating member when engaged by said top can layer to close said elevator valve and stop further vertical movement of the elevator, a horizontally reciprocating sweep member having a motor and a valve for actuating the same to sweep and discharge said top can layer from said pallet when said sweep member valve is closed, and means engageable with and actuated by said sweep member for closing said sweep member valve to stop further movement of the sweep member after removal of said topmost can layer on said pallet to permit said sweep member to be returned to its original position.

6. The container unloading machine defined in claim 5, wherein said sweep member is further operative to close said sweep valve and stop the sweep member upon return of the latter to original sweeping position, said elevator being progressively elevated layer by layer as described until all can layers have been discharged therefrom and thereafter lowered to redeposit the empty pallet on said conveyor, and control means actuated by the descending pallet to move said elevator valve to neutral position to stop further downward movement of the elevator after it has reached pallet discharge position at said station.

7. In a machine for unloading containers arranged in stacked layer formation on a pallet, the combination of a conveyor having a motor for advancing the pallet into and through an unloading station, a valve for controlling movement of said conveyor, movable means actuated by a pallet entering said station for opening said valve to stop said conveyor, an elevator at said station for receiving said pallet, a valve for actuating said elevator to lift said pallet into position for discharging said top layer of cans therefrom when the elevator valve is closed, a locating member connected to said elevator valve and movable into the path of said top can layer when said elevator valve is closed to lift said pallet, said connection being operative by said locating member when engaged by said top can layer to close said valve and stop further vertical movement of said elevator, a horizontally reciprocating sweep member having a motor and a valve for actuating the same to sweep and discharge said top can layer from said pallet when the valve is closed, means engageable with and actuated by said sweep member for closing said valve to stop further sweeping movement of the sweep member after removal of said topmost can layer on said pallet to permit said sweep member to be returned to its original position, said sweep member being further operative to close said sweep valve and stop the sweep member upon return of the latter to original sweeping position, said pallet elevator being progressively elevated layer by layer as described until all can layers have been discharged therefrom and thereafter lowered to redeposit said pallet on said conveyor, and control means actuated by the descending pallet to move said elevator valve to neutral position to stop further downward movement of said elevator when the same has reached its normal position.

References Cited in the file of this patent

UNITED STATES PATENTS

| | | |
|---|---|---|
| 1,247,722 | Rogers et al. | Nov. 27, 1917 |
| 2,253,617 | Griffith | Aug. 26, 1941 |
| 2,258,461 | Marsden et al. | Oct. 7, 1941 |
| 2,362,853 | Spiller et al. | Nov. 14, 1944 |
| 2,366,523 | Haig | Jan. 2, 1945 |
| 2,453,844 | Hungate | Nov. 16, 1948 |
| 2,610,729 | Marcantel | Sept. 16, 1952 |
| 2,633,251 | Bruce | Mar. 31, 1953 |
| 2,703,653 | Thomson | Mar. 8, 1955 |
| 2,774,489 | Guigas | Dec. 18, 1956 |
| 2,808,921 | Knowles | Oct. 8, 1957 |
| 2,843,223 | Villars | July 15, 1958 |